Sept. 26, 1944.  F. SAUTER  2,359,160

DEVICE FOR THE TIME CONTROL OF PHYSICAL VALUES

Filed Nov. 19, 1941

Inventor
F. Sauter.
By C. F. Wenderoth
Atty.

Patented Sept. 26, 1944

2,359,160

UNITED STATES PATENT OFFICE 2,359,160

DEVICE FOR THE TIME CONTROL OF PHYSICAL VALUES

Fritz Sauter, Basel, Switzerland, assignor to Fr. Sauter A. G. Fabrik Elektr. Apparate, Basel, Switzerland, a corporation of Switzerland Application November 19, 1941, Serial No. 419,808
In Switzerland December 13, 1940

6 Claims. (Cl. 161—1)

The present invention relates to a device for the time control of physical values.

The invention has for its primary object to provide an improved system or device for the time control of physical values such as temperatures, pressures, degrees of moistness or hygroscopicity, electric current characteristics, tension, power efficiency or the like by means of electrically operated control or steering members, responsive to time and in accordance with a predetermined control function capable of being varied at will without calling for a change of time elements.

Still another object of the invention is to provide an improved system or device for the time control of physical quantities wherein the control function can be visualized by a diagram or chart such as one drawn and plotted on the coordinate or the vector principle.

With these and such other objects in view as will incidentally appear hereinafter, the invention comprises the novel construction, combination and arrangement of parts that will now be described with reference to the accompanying diagrammatic drawing exemplifying a constructional embodiment of the same and forming a part of the present disclosure.

In the drawing—

A (Figure 1) designates in its entirety a controller or program selector by means of which power efficiency may be adjusted as a time function so as to fulfil proper requirements. B designates a switch clock adapted to deliver at regular intervals a current impulse to the controller A. C is an electric drive or actuator of reversible character for the operation of an electrode regulator E pertaining to an electrode boiler F, i. e., a boiler in which owing to the action of said regulator E electrodes may be moved upwardly or downwardly in a fluid so as to regulate their heating efficiency. D is a differential relay through which the actuator C may be operated upon from the controller A in accordance with the known art of differential resistance regulation. The controller A is provided with a series of controlling elements (controlling resistances) respectively fitted with controlling contacts adjustable responsive to time. Said controlling elements are sequentially operable from the switch clock B, whereby control in successive periods of time $t^1$—$t^2$, $t^2$—$t^3$, etc. (Figure 2), should give rise to a time controlled efficiency as symbolized by the diagrammatic chart in Figure 2.

Figure 2:
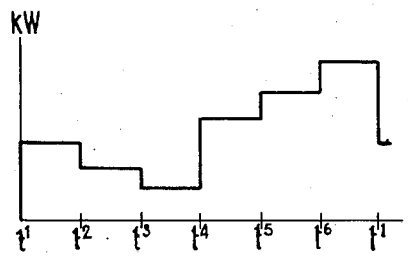
Figure 2 shows by way of example a power efficiency chart or diagram drawn responsive to time on the rectangular coordinate principle.

Assuming the required time controlled efficiency to be as shown by the curve drawn and plotted on the rectangular coordinate system in Figure 2, it will be seen that said curve comprises six steps. It will be understood, however, that it is also possible to use the same control principle by lessening the step intervals and by increasing the number of steps so as to produce any curve.

Figure 1:
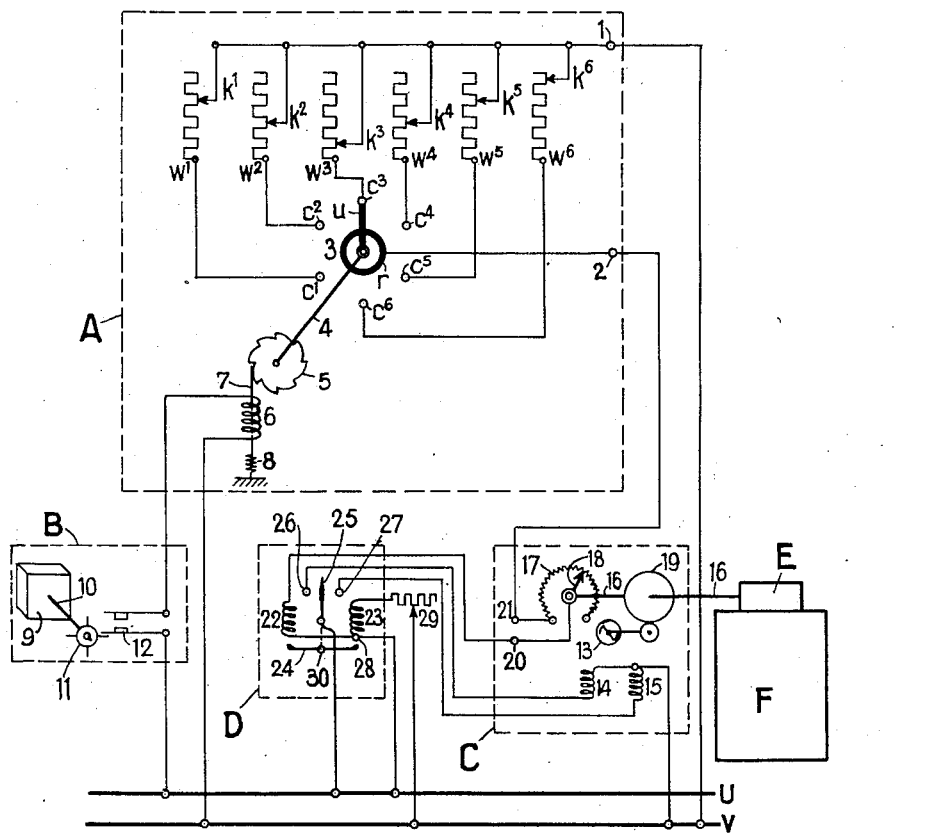
Figure 1 is a diagrammatic illustration showing the device in its entirety.

In accordance with the six time controls or steps as shown by the diagrammatic curve in Figure 2, the controller A illustrated in Figure 1 is fitted with six controlling elements $w^1$, $w^2$, $w^3$, $w^4$, $w^5$, $w^6$. Such elements are constituted in this embodiment by variable resistances whose ohmic value may be suitably adjusted between zero and a maximum figure by moving controlling contacts $k^1$, $k^2$, $k^3$, $k^4$, $k^5$, $k^6$. Said contacts $k^1$—$k^6$ are all electrically interconnected and connected, moreover, to a terminal 1. A contactor 3 is provided with six contact studs $c^1$—$c^6$ corresponding to the six elements $w^1$—$w^6$ and electrically connected to each of them respectively, namely, $c^1$ to $w^1$, $c^2$ to $w^2$ and so on. The contactor 3 is provided, moreover, with a movable contact arm or wiper $u$ adapted to establish an electric connection between the slip ring $r$ and anyone of the contact studs $c^1$—$c^6$ in accordance with the position assumed by said contact arm $u$. In Figure 1, the arm or wiper $u$ is in contact with the stud $c^3$ so that current can flow to the controlling element $w^3$ through said stud and members $u$, $r$ from the terminal 2.

The ohmic value of each of the controlling elements $w^1$—$w^6$ is selected by adjusting the controlling contacts $k^1$—$k^6$ in accordance with the required efficiency curve, for example as shown in Figure 2. Zero ohmic value corresponds to zero power efficiency while maximum ohmic value corresponds to maximum power efficiency, the intermediate values being proportionate to the power efficiency in each instance.

The movable wiper arm $u$ is secured with proper insulation to a revoluble shaft 4 carrying a ratchet or stepping wheel 5. An electromagnet 6 is provided so as, when energized, to shift its pawl-like armature 7 upwardly against an opposed spring 8, thereby rotating through the wheel 5 and shaft 4 the wiper arm $u$, for example clockwise. This moves the wiper arm $u$ from one of the contact studs $c^1$—$c^6$ to the following one. In the example illustrated, this will move the wiper arm $u$ off the stud $c^3$ to the stud $c^4$. When the electromagnet 6 is de-energized, its armature 7 is held back by the return spring 8 in its inoperative position, so that the wiper arm $u$ remains motionless until a new current impulse has exercised itself upon the electromagnet 6.

The switch clock B is provided with a contact stud 12 operated by a cam disc 11 driven through a shaft 10 by a clockwork mechanism or by a synchronous motor such as diagrammatically shown at 9. Said clock B is adapted to deliver at regular time intervals $t^1$—$t^6$ a current impulse to the electromagnet 6. The wiring is from line U of the operating circuit through contact stud 12 and electromagnet 6 to line V of said circuit. In the embodiment shown, actuation of the movable wiper arm $u$ is derived in the form of impulses from the controller A. However, it is also possible to arrange for the wiper arm $u$ to be continuously rotated by driving the same directly from a synchronous motor or like prime mover, in which case the switch clock B, electromagnet 6 and ratchet wheel 5 can be dispensed with.

The actuator C for the electrode regulator E comprises a motor 13 fed by alternating current and provided with a winding 14 for forward revolution and with a winding 15 for reverse revolution. The motor 13 actuates a shaft 16 through a gear 19. The shaft 16 is coupled to the movable contact arm 18 which is moved along the variable resistance 17. The shaft 16 is also coupled to the regulator E for the electrodes of the boiler F. The maximum depth to which said electrodes may be engaged and consequently the maximum efficiency of the boiler F corresponds to the zero ohmic value of the resistance 17. The intermediate values afforded by said resistance which are responsive to the positions occupied by the movable contact arm 18 proportionately determine the efficiency.

The differential relay D comprises a pair of coils or windings 22, 23, which magnetically operate a pivotable beam-like armature 24 and its contact stem 25. The armature 24 can pivot about its bearing axes 30. Should the influence of the coil 22 become overwhelming owing to the current being stronger through it than through the companion coil 23, the armature 24 is magnetically drawn by said coil 22, thereby setting up electric connection by its contact stem 25 with a stationary contact stud 27. Conversely, should the influence of the coil 23 become larger than that of the coil 22, the armature 24 establishes electric connection by its contact stem 25 with an oppositely located stationary contact stud 26. Lastly, should the magnetic influences of both coils 22, 23 be exactly equal to each other, the armature 24 remains horizontal in its neutral position, so that the contact stem 25 establishes connection neither with the contact stud 26 nor with the contact stud 27. The contact stem 25 then remains exactly midway between them.

The coil 23 of the differential realy D has one of its ends connected to line V of the operating circuit through a resistance 29 which, while being adjustable, may be regarded as constant. The other end of the coil 23 is connected through a terminal 28 to the circuit line U. As a result of this, a constant current flows through the coil 23, which involves a constant tension on the operating circuit. The coil 22 has one of its ends connected through the terminal 28 with phase U, while its other end is connected through the terminal 20 with the actuator C. Determination of the current flowing through the coil 22 is ensured by the ohmic value tapped by the movable contact arm 18 off the resistance 17. Since the resistance 17 is connected through the terminal 21 to the terminal 2 of the controller A, the controlling resistance $w^3$ connected through the wiper arm $u$ is also involved in the circuit of the coil 22 pertaining to the relay D. The wiring from line U is through terminal 28, coil 22, terminal 20, contact arm 18, resistance 17, terminals 21 and 2, slip ring $r$, wiper $u$, contact stud $c^3$, resistance $w^3$, slip contact $k^3$ and terminal 1 to line V.

Assuming now by way of example the current through coil 22 of relay D to be weaker than the current through coil 23, it will be understood that the armature 24 will be magnetically drawn by the coil 23, so that the contact studs 25 and 26 will touch each other, thus setting the winding 14 of the actuator C to line U. The motor 13 will set its shaft 16 into rotation and the electrodes will be shifted by the regular E associated with the boiler F. The contact arm 18 will be also operated and will pick off the resistance 17 a current of smaller ohmic value. The motor 13 will then remain in motion until the ohmic value of the current tapped by the contact arm 18 off the resistance 17 together with the ohmic value taken by $k^3$ off $w^3$ allows the current flow through the coil 22 of the relay D to be equal to that which flows through the coil 23. The armature then resumes its inoperative position, whereupon the contact stem 25 opens the circuit of the motor winding 14. Should, however, the current through the coil 22 of the relay D be larger than the one which flows through the coil 23, the winding 15 of the actuator C would likewise be switched on until due to tapping a larger ohmic value through contact arm 18 the current through the coil 22 would counterbalance the one through the coil 23.

When, following current balance in the coils 22 and 23 of the relay D, the actuator C becomes inoperative, it only begins to rotate again when, due to re-switching of the wiper $u$ of the controller A, another degree of resistance (for example $w^4$) is inserted into the circuit of the coil 22. The motor 13 then again revolves in the one or the other direction according to whether the ohmic value tapped by the contact $k^4$ off $w^4$ is larger or smaller than the one of the preceding degree. The motor 13 continues to revolve until current equality is reached in the coils 22, 23 due to rotation of the contact arm 18. The same process repeats itself each time the wiper $u$ of the controller A is again switched on. This provides for the desired time dependent control.

Figure 3:
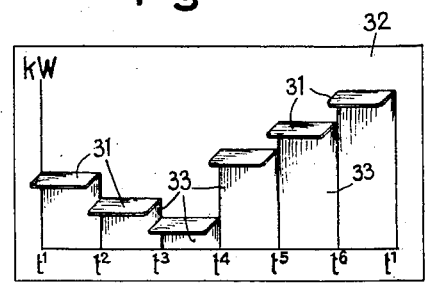
Figure 3 shows indexing means involving the use of time dependent control elements for use with a device working as brought out by the power efficiency chart represented in Figure 2.

In order to facilitate each adjustment of the time dependent function, the controlling elements $w^1$—$w^6$ are plotted on a rectangular coordinate system so that the movement of the adjustable contacts $k^1$—$k^6$ may take place vertically in the direction of the ordinate axis. As shown in Figure 3, the contacts $k^1$—$k^6$ are in the form of small plates 33 provided with index lugs 31. Said plates are visible on a base plate 32 (Figure 3) serving as a foundation for the coordinate system and can be moved up and down, thereby establishing on the rear side a contact with the controlling resistances. The distance between the index lugs 31 and the abscissae axis is a measure of the power efficiency. The controlling resistances $w^1$—$w^6$ are arranged side by side so that their sequence coincides with the time axis in the direction of the abscissae axis. Therefore, the adjusted control function is rendered visible or visualized in a rectangular coordinate system. The index plates 33 visualize the control diagram.

In Figure 1 are shown six time dependent controlling elements only but a larger number of such elements may be used to suit requirements, for example twenty four controlling elements so as to provide for adjustment of a time dependent function in accordance with the twenty four hours of the day.

The device as hereinbefore described can be carried into practice for controlling any physical quantity such as a temperature, a pressure, a moisture degree, a current, a tension, a power efficiency, etc., by means of electrically operated control members in dependence upon time and according to a predetermined control function.

Numerous minor constructional details might be varied in the construction shown without departing from the scope of the subjoined claims.

What I claim is:

1. Device for the time control of physical values, comprising an electrically operated actuator, a controller including a series of elements each having a manually operable controlling member, these elements being so sequentially arranged in a row as to form a figure such as a diagram or chart, a regulating circuit, and a time contactor associated with said elements for sequentially switching them onto and then off from said regulating circuit so as to regulate said quantity responsively to time.

2. Device for the time control of physical values, comprising an electrically operated actuator, a controller including a series of elements, each element having a manually operable controlling member, said elements being sequentially plotted on the abscissae axis of a rectangular coordinate system, a visible mark on each controlling member, said marks connoting in the direction of the ordinate axis measures of the physical value to be regulated, said elements being so wired as to regulate the actuator, and a time contactor associated with said elements for sequentially switching them on and then off so as to regulate said value responsively to time.

3. Device for the time control of physical values, comprising an electrically operated actuator, a controller including a series of variable resistances, a manually operable contact cooperating with each of said resistances, an index axis, a visible mark on each contact, the distance between contact and axis representing a measure of the physical quantity to be regulated, said resistances being so wired as to regulate the actuator, and a time contactor associated with said resistances for switching them on and then off in time sequence so as to regulate said quantity in time dependence.

4. Device for the time control of physical values such as a temperature, a pressure, a current, a moisture degree or a tension, comprising an electrically operated actuator, a controller including a series of elements, manually operable controlling members associated with the respective elements, an index, a visible mark on each controlling member, the distance from index to mark being a measure of the physical value to be regulated, said elements being so wired as to regulate the actuator operation, a switch clock, a contactor, and ratchet and contact making means interposed between said contactor and clock, the contactor being associated with said elements for successively switching them on and then off so as to regulate said value responsively to time.

5. Device for the time control of physical values, comprising an electric circuit, an actuator comprising a motor wired to said circuit, a quantity regulator, a gear interconnecting the motor and regulator, a controller including a series of variable resistances, manually operable contacts associated with the respective resistances, an index, a visible mark on each contact, the distance between index and contact giving a measure of the quantity to be regulated, said resistances being sequentially connectable to the motor for regulating the actuator operation, a clock, a contactor operated from said clock and including a wiper cooperating with the successive resistances for switching them on and then off responsive to clock impulses so as to regulate said value in time dependence.

6. Device for the time control of physical values, comprising an alternating current circuit, an actuator including a motor having its windings wired to one line of the circuit, a value regulator, a gear interconnecting the motor and regulator, a variable resistance element associated with the gear, a controller including a row of variable resistances each fitted with a manually operable contact, all such contacts being connected to said line, the input terminals of said resistances being arranged on a circle, an index, a visible mark on each contact, the distance from index to contact visualizing the value to be regulated, a switch clock, an electromagnet having a spring-urged armature carrying a pawl and being connected to the clock contacts across the circuit lines, a ratchet gear operated step-by-step by said pawl, a shaft actuated by said gear and carrying an insulated wiper for said input terminals, a slip ring serving said wiper and connected with said variable resistance element, and a differential relay including a pair of coils fed by the other circuit line and a pivotable armature having a stem connected to the last-named line and cooperating with either of a pair of contact studs respectively connected to the motor windings.

FRITZ SAUTER.